F. L. LANE & F. R. WEAVER.
CUTTER HEAD.
APPLICATION FILED JULY 2, 1915.
1,183,015.
Patented May 16, 1916.
2 SHEETS—SHEET 2.
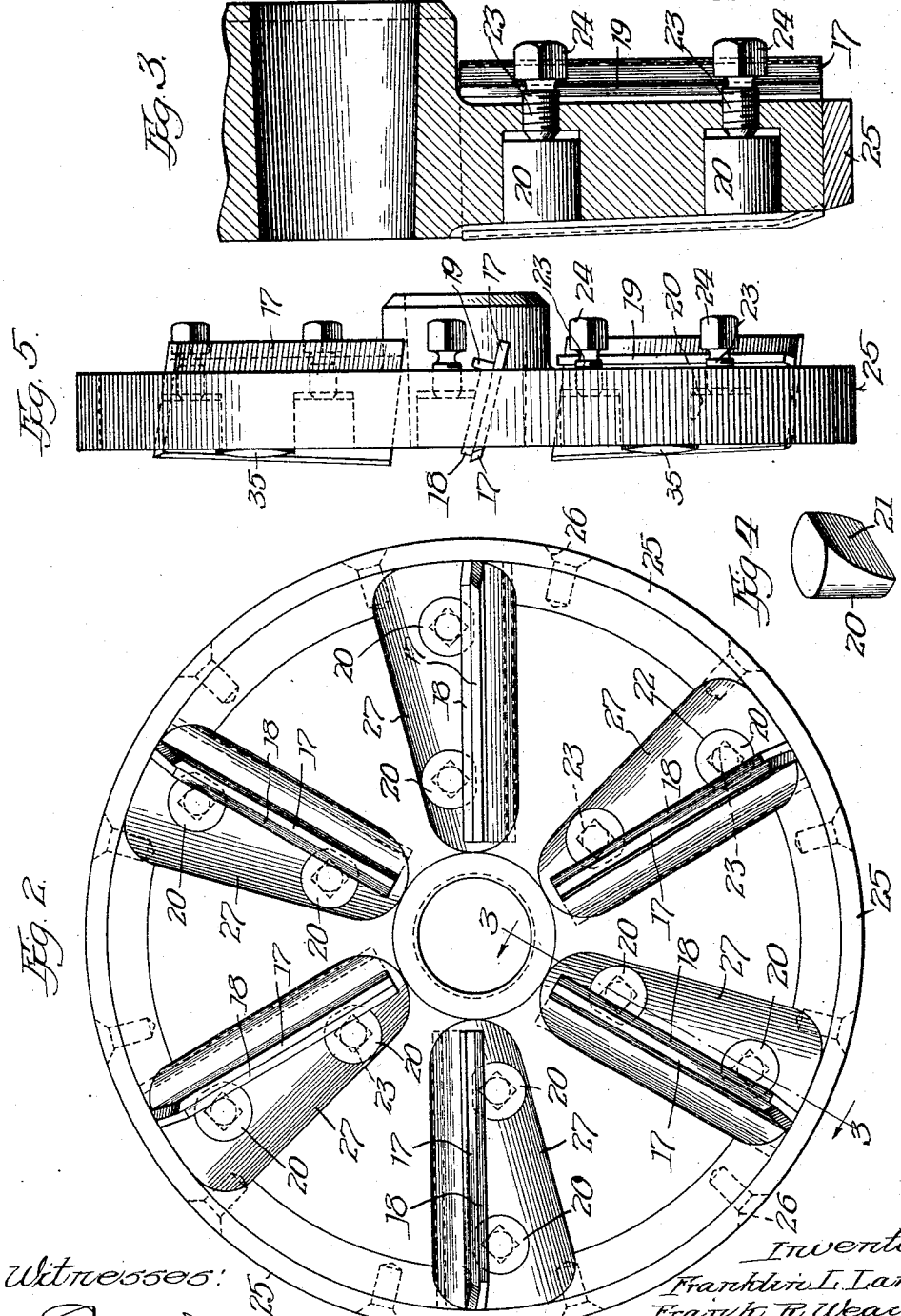

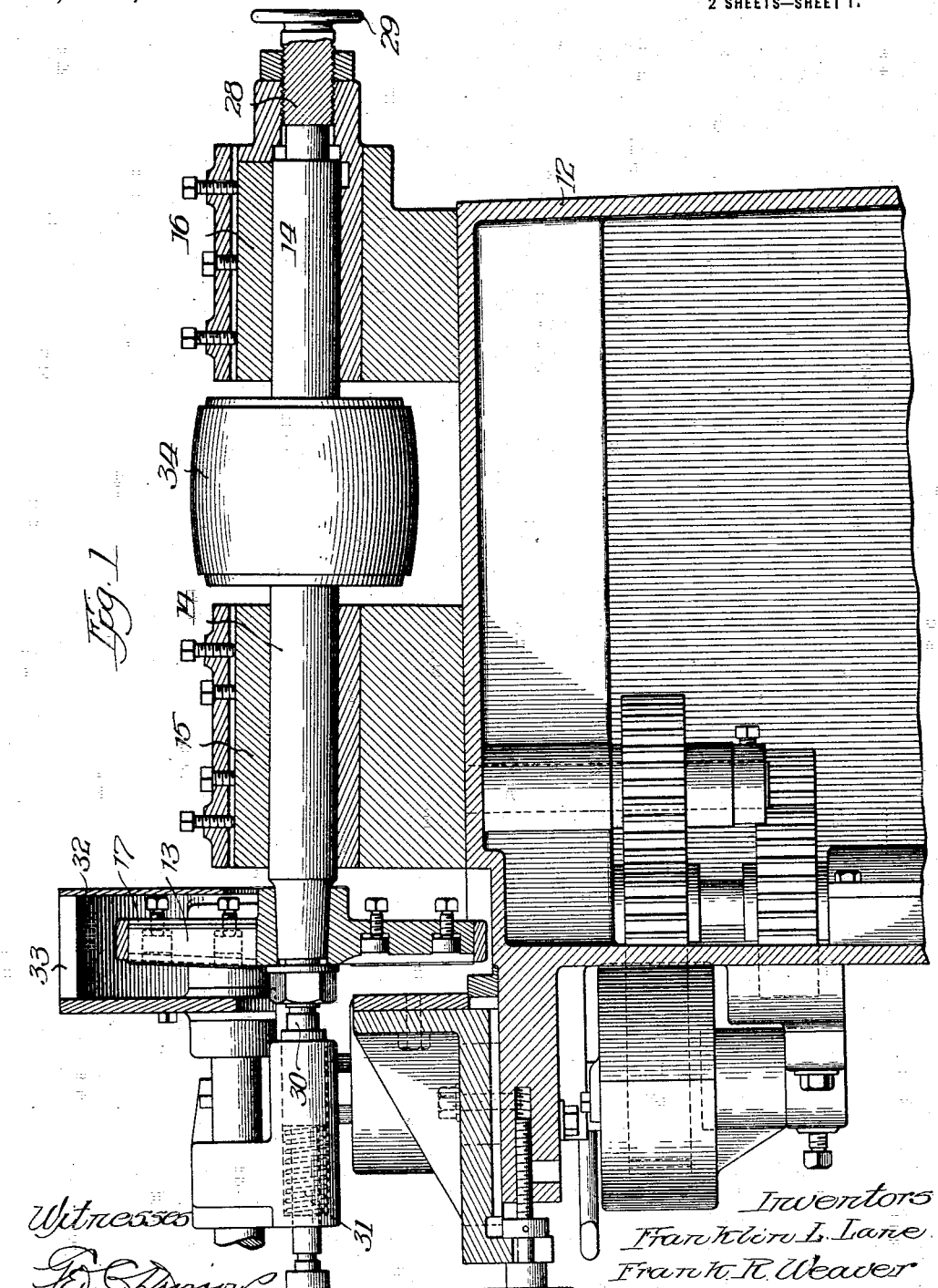

UNITED STATES PATENT OFFICE.

FRANKLIN L. LANE AND FRANK R. WEAVER, OF BELOIT, WISCONSIN, ASSIGNORS TO THE BERLIN MACHINE WORKS, OF BELOIT, WISCONSIN, A CORPORATION OF WISCONSIN.

CUTTER-HEAD.

1,183,015.  Specification of Letters Patent.  Patented May 16, 1916.

Original application filed January 25, 1915, Serial No. 4,176. Divided and this application filed July 2, 1915. Serial No. 37,638.

*To all whom it may concern:*

Be it known that we, FRANKLIN L. LANE and FRANK R. WEAVER, citizens of the United States, residing at Beloit, in the county of Rock and State of Wisconsin, have invented certain new and useful Improvements in Cutter-Heads, of which the following is a specification, the same being a division of our co-pending application, Serial No. 4,176, filed January 25, 1915.

The invention relates to wood working machinery of the matcher type and has for its principal object the construction and mounting of the cutter head in such manner as to effect that in one passage through the machine the lumber or other rough material shall be smooth finished with no tool marks and shall require no further or supplemental surface treatment to qualify it to meet the most exacting requirements as to finish.

Other advantageous features of construction from the standpoint of simplicity, efficiency, compactness and ease and permanency of adjustment will be hereinafter made apparent.

In order that the invention may be readily understood by those skilled in the art, a preferred embodiment of the same in a wood working machine is set forth in the accompanying drawings and in the description based thereon. As, however, the invention is susceptible of embodiment in other and varied constructional forms dependent upon the material and the nature of the work to be performed, the drawing and description are to be taken in an illustrative and not in an unnecessarily limiting sense.

In the drawings—Figure 1 is a longitudinal section through the cutter head and its mounting; Fig. 2 is a face view of the cutter head; Fig. 3 is an enlarged fragmentary section on the line 3—3 of Fig. 2; Fig. 4 is a detail view in perspective of one of the knife-adjusting blocks; and Fig. 5 is an edge view of a modified form of cutter head.

Transversely of the machine frame indicated at 12 is mounted the finishing cutter head 13 upon the shaft 14 journaled in the bearings 15, 16 at a slight inclination to the horizontal, as most clearly shown in Fig. 1. The cutter head 13 has a convex or beveled front face, the inclination to each other of those portions of the face on opposite sides of the center being slight and of such extent that when mounted with the shaft 14 at a slight inclination to the horizontal the lower portion of the face of the cutter head will occupy a vertical position, or in a plane parallel to the plane of travel of the stock through the machine at the line of contact with the stock while the upper portion of the face will lie in a plane at an angle to the vertical and at an angle to the plane of the travel of the stock.

Within the cutter head are mounted a plurality of knives 17 with their cutting edges conforming to the bevel of the coned face of the head and substantially flush with the said front face. These knives are mounted within slots of the cutter head in conjunction with gibs 18 having offset heads 19 by means of which their position within the slots is fixed with their outer ends adjacent the cutting edges of the knives where they act as chip-breakers. The knives 17 are positioned and firmly held within the slots by means of blocks 20 of a general cylindrical shape but having a bevel face 21. The blocks are slidably mounted within cylindrical recesses 22, the axes of which are substantially parallel to the axis of the cutter head and, therefore, at an inclination to the knife slots which are at an angle to the axis of the cutter head, the inclined face 21 of the block being substantially parallel to the slot and consequently adapted to bear against the flat face of the gib. The rear end of each block 20 is borne upon by a set screw 23 threaded in the cutter head and squared at 24 for engagement by a suitable tool. For convenience in manufacture the knife slots are milled and extend outwardly to a periphery of the cutter head and a rim 25 is thereafter placed about the cutter head inclosing the ends of the slot, being held in place by means of the screws 26.

The front face of the cutter head where the knives project is provided with grooves 27, that portion of the groove in front of the knife edge having a greater capacity at its outer end, such increase of capacity being attained, as illustrated, by forming said groove of increasing width toward its outer end although a similar result may be attained by increasing the depth of the groove toward the outer end, the object being in both cases to provide a clearance channel for the chips by which they are discharged radially.

The object in beveling or coning the operative face of the cutter and mounting its shaft at such an inclination that those knives which are operating upon the stock shall have their cutting edges substantially parallel to the plane of travel of the stock while the opposite knives shall be inclined to such plane, is that the knives shall gradually enter the material and gradually leave the same with the grain of the wood and effect a drawing cut throughout whereby knife marks are entirely avoided and an absolutely smooth finish imparted to the work.

It will be noted that the front face of the cutter head between the knives is substantially flush with the cutting edges of the knives themselves, providing for a projection of the knives merely sufficient to make a thin cut. The object of this provision is that the material in its passage through the machine shall be supported by the face of the cutter head between the knives. This is of great importance particularly where a large cutter head is employed and where warped stock is being treated. Otherwise the material, being unsupported, could spring toward the cutter head and the depth of the cut would be nonuniform.

The cutter head shaft 14 is provided at its rear end with an end thrust bearing 28 adjustable by means of a hand wheel 29 while the forward end of said shaft is provided with an end thrust bearing 30 which is yielding and under control of a compression spring 31, the tension of which spring is adjustable to provide for greater or less resistance.

The cutter head 13 is inclosed within a housing 32 open at its upper side at 33 for communication with an exhaust device and its shaft 14 is driven from a suitable source of power by a pulley 34.

In Fig. 5 is shown in edge elevation a slightly modified form of cutter head, the features of difference being that the front face of the head, instead of lying throughout in approximately the rotational plane of the cutting edges of the tools and being provided with special chip-clearance grooves, has at certain points intermediate the knives projecting bosses 35, the front slightly beveled faces of which extend to a plane substantially flush with the knife edges and form a side support for the stock, the depressed face of the head between the bosses and knives serving the same chip clearance function as the grooves 27 in the former case.

We claim:

1. In a machine of the character described, the combination of a cutter head having an operative face, and cutters mounted in grooved recesses of the head, said grooves extending radially both in the rear and in front of the knives and having in front thereof a cross-sectional area increasing outwardly, the grooves occupying in the aggregate not less than substantially one-half the total area of the face.

2. In a machine of the character described, the combination of a cutter head having a convex operative face, the cutter head shaft journaled at such an inclination as to maintain the operative half portion of the face in a plane parallel to the plane of travel of the stock through the machine, and cutters mounted in recesses of the cutter head, radial chip-clearance grooves in the convex face both in the rear and in front of the knives, said grooves having in front of the knives a cross sectional area increasing outwardly and occupying in the aggregate not less than substantially one-half of the total area of the face.

3. In a machine of the character described, the combination of a cutter head having a convex operative face, the cutter head shaft journaled at such an inclination as to maintain the operative half portion of the face in a plane parallel to the plane of travel of the stock through the machine, and cutters mounted in grooved recesses of the cutter head with their edges substantially flush with the general surface of the head between said grooves, the grooves occupying in the aggregate not less than substantially one-half the total area of the face.

4. In a machine of the character described, the combination of a cutter head having a convex operative face, the cutter head shaft journaled at such an inclination as to maintain the operative half portion of the face in a plane parallel to the plane of travel of the stock through the machine, radial outwardly widening chip-clearance grooves in the convex face of the cutter head, slots extending from the bottom of the grooves to the rear of the head, knives mounted in the slots, and gibs bearing on the knives and projecting as chip-breakers beyond the bottom of the grooves adjacent and in front of the cutting edges of the knives, the grooves occupying in the aggregate not less than substantially one-half the total area of the face.

5. In a machine of the character described, the combination of a cutter head having a convex operative face, the cutter head shaft journaled at such an inclination as to maintain the operative half portion of the face in a plane parallel to the plane of travel of the stock through the machine, radial outwardly widening chip-clearance grooves in the convex face of the cutter head, slots extending from the bottom of the grooves to the rear of the head, knives mounted in the slots in spaced relation to the side walls of the grooves and with their cutting edges substantially flush with the most prominent surface of the head between the grooves, and gibs bearing on the knives and projecting as chip-breakers beyond the bottom of the grooves adjacent and in front of the cutting edges of the knives, the grooves occupying in the aggregate not less than substantially one-half the total area of the face.

6. In a machine of the character described, the combination of a cutter head having a convex operative face, the cutter head shaft journaled at such an inclination as to maintain the operative half portion of the face in a plane parallel to the plane of travel of the stock through the machine, radial outwardly widening chip-clearance grooves in the convex face of the cutter head, slots extending from the bottom of the grooves to the rear of the head, knives mounted in the slots, gibs also mounted within the slots in spaced relation to the side walls of the grooves and bearing upon the knives, blocks slidably mounted within recesses of the cutter head intersecting the slots and at a slight inclination thereto, and set screws bearing upon the blocks to force the same against the gibs whereby to clamp the knives in adjusted position.

7. In a machine of the character described, the combination of a cutter head having a convex operative face, the cutter head shaft journaled at such an inclination as to maintain the operative half portion of the face in a plane parallel to the plane of travel of the stock through the machine, radial outwardly widening chip-clearance grooves in the convex face of the cutter head, slots extending from the bottom of the grooves to the rear of the head, knives mounted in the slots in spaced relation to the side walls of the grooves and with their cutting edges substantially flush with the most prominent surface of the head between the grooves, gibs bearing on the knives and projecting as chip-breakers beyond the bottom of the grooves to a point adjacent and in advance of the cutting edges, blocks mounted in the recesses of the cutter head intersecting the slots and at a slight inclination thereto, and set screws bearing upon the blocks to force the same against the gibs to clamp the knives firmly in adjusted position.

8. In a machine of the character described, the combination of a cutter head and cutting tools mounted therein with their edges in operative relation to the front face of the head, the said face provided intermediate the tools with portions occupying approximately the same plane as the tool edges and with intervening portions lying in a materially lower plane, the intervening portions constituting in the aggregate not less than substantially one-half the total area of the face.

9. In a machine of the character described, the combination of a cutter head provided with tool receiving slots, tools mounted in the slots, and gibs disposed in the slots and bearing on the tools with their forward edges lying as chip breakers immediately in front of the tool edges, the gibs having heads bearing on the rear faces of the cutter head to limit their forward movement, and tool clamping means mounted for movement at an angle to the plane of the gibs and bearing thereon to press the gibs against the tool.

10. In a machine of the character described, the combination of a cutter head provided with tool receiving slots, tools mounted in the slots with their cutting edges extending into operative relation to the front face of the head, the head provided on its front face intermediate the tools with bosses having front faces occupying approximately the same plane as the tool edges and with intervening portions lying in a materially lower plane, and tool clamping gibs disposed in the slots and bearing on the tools with their forward edges lying as chip-breakers immediately in front of the tool edges.

Signed at Beloit, Wisconsin, this 28th day of June, 1915.

FRANKLIN L. LANE.
FRANK R. WEAVER.

Witnesses:
P. D. WESTMAN,
F. A. HORSTMANN.

Copies of this patent may be obtained for five cents each, by addressing the "Commissioner of Patents, Washington, D. C."